(12) United States Patent
Brandis, Jr.

(10) Patent No.: US 8,467,957 B2
(45) Date of Patent: Jun. 18, 2013

(54) METHOD AND APPARATUS FOR GENERATING ROUTES USING REAL-TIME PUBLIC TRANSPORTATION INFORMATION

(75) Inventor: Edward H. Brandis, Jr., Chicago, IL (US)

(73) Assignee: Clever Devices, Ltd., Plainview, NY (US)

( * ) Notice: Subject to any disclaimer, the term of this patent is extended or adjusted under 35 U.S.C. 154(b) by 845 days.

(21) Appl. No.: 12/482,203

(22) Filed: Jun. 10, 2009

(65) Prior Publication Data

US 2009/0312947 A1    Dec. 17, 2009

Related U.S. Application Data

(60) Provisional application No. 61/060,560, filed on Jun. 11, 2008.

(51) Int. Cl.
| | | |
|---|---|---|
| G08G 1/123 | (2006.01) |
| G06F 19/00 | (2006.01) |
| G01C 21/00 | (2006.01) |
| G01C 21/34 | (2006.01) |

(52) U.S. Cl.
USPC .......................................................... 701/410

(58) Field of Classification Search
USPC .................. 701/200, 201, 202, 204, 206–209, 701/213, 400, 408, 409, 410, 414, 418, 420, 701/423, 425, 454, 465, 532, 533, 537, 538; 340/988, 994, 995.12, 995.19, 989, 990, 340/995.1, 995.13
See application file for complete search history.

(56) References Cited

U.S. PATENT DOCUMENTS

| | | | |
|---|---|---|---|
| 6,163,748 A * | 12/2000 | Guenther | 701/202 |
| 6,272,429 B1 * | 8/2001 | Dansby | 701/202 |
| 6,421,606 B1 * | 7/2002 | Asai et al. | 701/209 |
| 2008/0030379 A1 * | 2/2008 | Park | 340/994 |
| 2009/0018901 A1 * | 1/2009 | Toyoda et al. | 705/13 |
| 2009/0287408 A1 * | 11/2009 | Gerdes et al. | 701/202 |
| 2010/0088026 A1 * | 4/2010 | Manolescu | 701/213 |
| 2010/0134324 A1 * | 6/2010 | Kim et al. | 340/994 |
| 2010/0259421 A1 * | 10/2010 | Kim et al. | 340/994 |
| 2010/0268450 A1 * | 10/2010 | Evanitsky | 701/201 |
| 2011/0010084 A1 * | 1/2011 | Carlsson et al. | 701/201 |

\* cited by examiner

*Primary Examiner* — Thomas Tarcza
*Assistant Examiner* — Edward Pipala
(74) *Attorney, Agent, or Firm* — The Farrell Law Firm, P.C.

(57) ABSTRACT

A method and system are provided for providing a transportation route to a user terminal. Travel information is received at a route-generating unit from the user terminal. Public transportation information, including real-time public transportation information, is received at the route-generating unit from a public transportation information unit. One or more transportation routes are determined in accordance with the received travel information and the received public transportation information at the route-generating unit. The one or more transportation routes are transmitted from the route-generating unit to the user terminal.

17 Claims, 2 Drawing Sheets

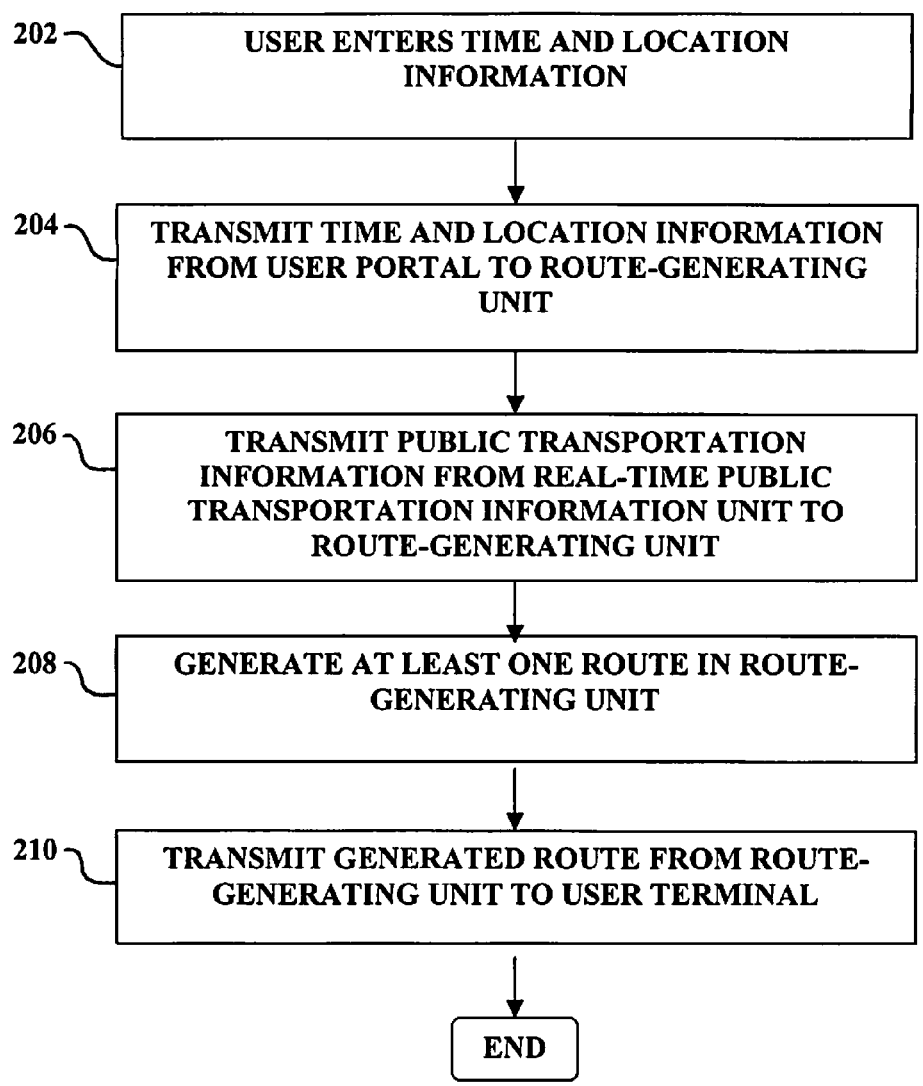

METHOD AND APPARATUS FOR GENERATING ROUTES USING REAL-TIME PUBLIC TRANSPORTATION INFORMATION

PRIORITY

This application claims priority under 35 U.S.C. §119(e) to a U.S. Provisional Patent Application filed on Jun. 11, 2008, and assigned Ser. No. 61/060,560, the disclosure of which is incorporated herein by reference.

BACKGROUND OF THE INVENTION

1. Field of the Invention

The present invention relates generally to a route generating system, and more particularly, to a system and method for generating routes using real-time public transportation information.

2. Description of the Related Art

Multi-modal transportation systems provide a choice between different transportation modes. A real-time passenger information system provides real-time estimated arrival and departure times of public transportation vehicles, such as buses, through a combination of public transportation vehicle schedule information and real-time location information of public transportation vehicles. However, a user desiring to plan a trip using the passenger information must manually plan a route from a starting point to a destination point. The process of selecting a route may be time-consuming, and further, a user may not select a route best suited to a user's preferences, such as desired departure time, desired arrival time, minimum total travel time, etc.

SUMMARY OF THE INVENTION

The present invention has been made to address at least the above problems and/or disadvantages and to provide at least the advantages described below. Accordingly, an aspect of the present invention provides a method for planning trips, and more particularly, a method for planning trips using real-time public transportation information in combination with user-input such as starting and destination points and desired departure and arrival times.

According to one aspect of the present invention, a method is provided for providing a transportation route to a user terminal. Travel information is received at a route-generating unit from the user terminal. Public transportation information, including real-time public transportation information, is received at the route-generating unit from a public transportation information unit. One or more transportation routes are determined in accordance with the received travel information and the received public transportation information at the route-generating unit. The one or more transportation routes are transmitted from the route-generating unit to the user terminal.

According to another aspect of the present invention, an apparatus is provided for providing a transportation route to a user terminal. The apparatus receives travel information from the user terminal, receives public transportation information, including real-time public transportation information, from a public transportation information unit, determines one or more transportation routes in accordance with the received travel information and the received public transportation information, and transmits the one or more transportation routes to the user terminal.

According to a further aspect of the present invention, a system is provided for providing a transportation route to a user terminal. The system includes the user terminal that provides travel information to a routing system, and a public transportation information unit that provides public transportation information, including real-time public transportation information, to the routing system. The system also includes the routing system for receiving the travel information from the user terminal, receiving the public transportation information from the public transportation information unit, determining one or more transportation routes in accordance with the received travel information and the received public transportation information, and transmitting the one or more transportation routes to the user terminal.

BRIEF DESCRIPTION OF THE DRAWINGS

The above and other aspects, features and advantages of the present invention will be more apparent from the following detailed description when taken in conjunction with the accompanying drawings, in which:

FIG. 2 is a flowchart illustrating a method of generating at least one transportation route, according to an embodiment of the present invention.

DETAILED DESCRIPTION OF PREFERRED EMBODIMENTS

Figure 1:
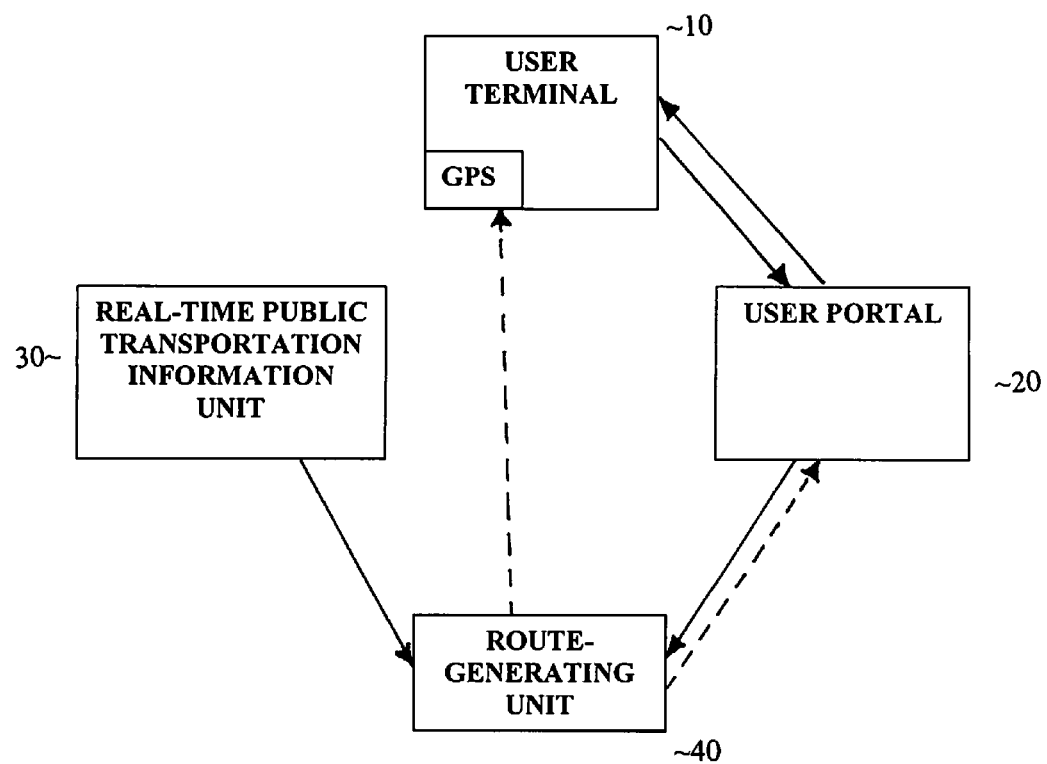
FIG. 1 is a block diagram illustrating a system for providing a transportation route, according to an embodiment of the present invention.

Preferred embodiments of the present invention are described in detail with reference to the accompanying drawings. Detailed descriptions of constructions or processes known in the art may be omitted to avoid obscuring the subject matter of the present invention. Further, in the following description of the present invention, various specific definitions found in the following description are provided only to provide a general understanding of the present invention, and it is apparent to those skilled in the art that the present invention can be implemented without such definitions.

Referring initially to FIG. 1, a block diagram illustrates a system for providing a transportation route, according to an embodiment of the present invention. The system includes a user terminal 10, a user portal 20, a real-time public transportation information unit 30, and a route-generating unit 40.

The user terminal 10 may be implemented as a cell phone, a Personal Digital Assistant (PDA), a personal computer, a laptop with a display, or another terminal device having at least one input device. The user terminal 10 is connected to both the user portal 20 and the route-generating unit 40. In an embodiment of the present invention, the user terminal 10 includes a location-detecting unit 10a, which utilizes a Global Positioning System (GPS) service or another service in determining a current location of the user terminal 10.

The user portal 20 receives input required for generating a route via the user terminal 10. A user enters the required information using a user interface provided by the user portal 20, through the user terminal 10. The user interface may be implemented as a web page accessed by the user terminal 10 or as an application installed in the user terminal 10.

The user-provided information includes at least a starting point and a destination point, which correspond to a starting address and a destination address. Additional information that may be provided by the user includes a departure time and an expected arrival time. The user-provided information may further include one or more intermediate destinations to be visited between the starting point and the destination point. If the user selects a current location of the user terminal as a starting point, the user terminal may provide current location information from the location-detecting unit 10a to the user portal 20.

The user terminal 10 may be provided with a list of scheduled events, such as movies or plays, having associated time and location information. A user may select a scheduled event provided in the user terminal 10, to provide the time and location information associated with the selected event as the arrival time and destination point, respectively, to the user portal 20.

Once a user has completed providing input data to the user portal 20, the user portal 20 transmits the input data to a route-generating unit 40. In addition to receiving the user input through the user portal 20, the route-generating unit 40 receives public transportation information from the real-time public transportation unit 30. The public transportation information includes public transportation schedule information and real-time public transportation information.

Only a starting point and a destination point are required from the user input in order to generate a transportation route, when it is assumed that the current time is the departure time and that there is no required arrival time. A departure time, an expected arrival time, and intermediate destinations are utilized to further customize the transportation route.

The public transportation schedule information includes scheduled arrival and departure times and locations for stops along the respective routes of various public transportation vehicles. The various public transportation vehicles may include buses, trains, subways, trolleys, monorails, etc.

The real-time public transportation information is derived from the public transportation schedule information and real-time location information of the various public transportation vehicles to provide estimated arrival and departure times and locations for stops along the respective routes of the various public transportation vehicles. For example, if a bus is scheduled to travel from a stop A to a stop B, but the real-time location information indicates that the bus arrives at stop A ten minutes later than a time the bus is scheduled to arrive at stop A, the real-time public transportation information may indicate that the bus is estimated to arrive at stop B at a time later than a time that the bus is scheduled to arrive at stop B.

The route-generating unit 40 utilizes both the public transportation schedule information and the real-time public transportation information to generate at least one route, via public transportation, from the user-provided starting point to the destination point. A generated route may include multiple modes of transportation.

For example, a generated route from a starting point to a destination point may direct a user as follows: Walk, starting at a specified departure time, from the starting point to a first bus stop; board a bus, at the first bus stop, shortly before a scheduled or estimated departure time of the bus at the first bus stop; depart the bus, at a second bus stop, at a scheduled or estimated arrival time of the bus at the second bus stop; walk from the second bus stop to a first subway station; board a subway train, at the first subway station, shortly before a scheduled or estimated departure time of the subway train at the first subway station; depart the subway train, at a second subway station, at a scheduled or estimated arrival time of the subway train at the second subway station; walk from the second subway station to the destination point; and arrive at the destination point at a scheduled arrival time.

Upon generating the at least one route, the route-generating unit 40 transmits the generated at least one route to the user terminal 10, either directly, or via the user portal 20. The route-generating unit may provide a plurality of transportation routes each having different options with respect to the route traveled, the modes of transportation included in the route, and the number of transfers between modes of transportation along the transportation route.

Referring now to FIG. 2 a flow diagram illustrates a method for generating a transportation route, according to an embodiment of the present invention. In block 202, the user provides input data, including a starting point and a destination point to the user portal 20 via the user terminal 10. As discussed above, the input data may also include a departure time, an expected arrival time, and intermediate destinations.

In block 204, the user portal 20 provides the user-input data to the route-generating unit 40. If a current location is selected as a starting point, the location-detecting unit 10a provides current location information, through the user terminal 10, to the route-generating unit 40. In block 206, the real-time public transportation information unit 30 provides public transportation schedule information and real-time public transportation information, which includes estimated arrival and departure times of public transportation vehicles, to the route-generating unit 40.

In block 208, the route-generating unit 40 uses the information received in blocks 204 and 206 to generate at least one route between the provided starting point and the provided destination point. If intermediate points are included in the information received by the route-generating unit 40, the intermediate points are included in the generated at least one route between the starting point and the destination point. For example, if points C and D are selected as starting and destination points, respectively, and point E is selected as an intermediate point, the route-generating unit 40 will generate at least one route from point C to point D comprised of combinations of first and second sub-routes, where a first sub-route is from point C to point E and a second sub-route is from point E to point D.

In block 210, the generated at least one route is transmitted from the route-generating unit 40 to the user terminal 10, either directly or through the user portal 20.

Additional embodiments of the present invention incorporate the use of reminders that alert the user of when a mode of transportation will arrive. The user may also be provided with the option of choosing when these reminders are issued. Further embodiments of the present invention incorporate bulletins or advisories that may be sent to the user that are associated with the routes and stops provided in the transportation route of the user.

While the invention has been shown and described with reference to certain preferred embodiments thereof, it will be understood by those skilled in the art that various changes in form and detail may be made therein without departing from the spirit and scope of the invention as defined by the appended claims.

The invention claimed is:

1. A method for providing a transportation route to a user terminal comprising the steps of:

receiving travel information at a route-generating unit from the user terminal;

receiving public transportation information, comprising public transportation schedule information and real-time public transportation information, at the route-generating unit from a public transportation information unit;

determining one or more transportation routes at the route-generating unit in accordance with the received travel information and the received public transportation information; and transmitting the one or more transportation routes from the route-generating unit to the user terminal, wherein the real-time public transportation information is derived from the public transportation schedule information and real-time location information of a plurality of public transportation vehicles.

2. The method of claim 1, wherein the travel information is provided in accordance with location and time information associated with a scheduled event that is selected from the user terminal.

3. The method of claim 1, wherein the public transportation information comprises information on at least one of buses, trains, subways, trollies and monorails.

4. The method of claim 1, wherein the one or more transportation routes comprise multiple modes of transportation.

5. The method of claim 1, wherein the one or more transportation routes are transmitted from the route-generating unit to the user terminal via a user portal.

6. The method of claim 1, wherein the travel information comprises at least one of starting point information, destination point information, and timing information.

7. The method of claim 6, wherein the departure information and the destination information each comprise an address, and the timing information comprises at least one of a departure time and an arrival time.

8. The method of claim 7, wherein the one or more transportation routes comprise one or more modes of transportation from an address of the starting point information to an address of the destination point information.

9. The method of claim 6, wherein the travel information further comprises at least one intermediate destination.

10. The method of claim 9, wherein each of the one or more transportation routes comprises a different combination of subroutes to and from the at least one intermediate destination, wherein a first subroute starts at an address of the starting point information and a last subroute ends at an address of the destination point information.

11. The method of claim 6, wherein the starting point information is determined by a location-detecting unit of the user terminal.

12. The method of claim 11, wherein the location-detecting unit utilizes a Global Positioning System (GPS) service.

13. The method of claim 1, further comprising providing access for the user terminal through an interface provided by a user portal.

14. The method of claim 13, wherein the interface comprises at least one of a web page and an application on the user terminal.

15. The method of claim 13, wherein the user terminal comprises at least one of a cellular phone, a Personal Digital Assistant (PDA), and a personal computer.

16. An apparatus for providing a transportation route to a user terminal, wherein the apparatus receives travel information from the user terminal, receives public transportation information, comprising public transportation schedule information and real-time public transportation information, from a public transportation information unit, determines one or more transportation routes in accordance with the received travel information and the received public transportation information, and transmits the one or more transportation routes to the user terminal,
wherein the real-time public transportation information is derived from the public transportation schedule information and real-time location information of a plurality of public transportation vehicles.

17. A system for providing a transportation route to a user terminal comprising:
the user terminal that provides travel information to a routing system;
a public transportation information unit that provides public transportation information, comprising public transportation schedule information and real-time public transportation information, to the routing system; and
the routing system for receiving the travel information from the user terminal, receiving the public transportation information from the public transportation information unit, determining one or more transportation routes in accordance with the received travel information and the received public transportation information, and transmitting the one or more transportation routes to the user terminal,
wherein the real-time public transportation information is derived from the public transportation schedule information and real-time location information of a plurality of public transportation vehicles.

\* \* \* \* \*